Figure 5:
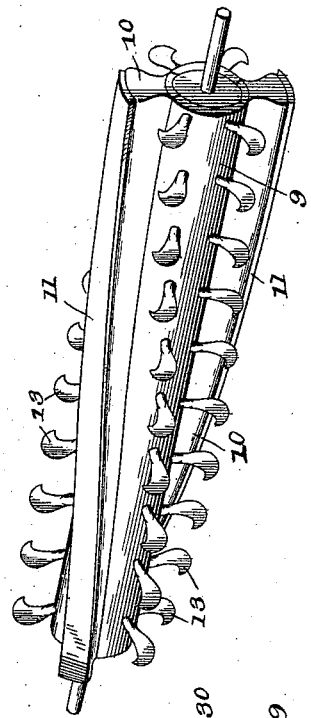

(No Model.) 5 Sheets—Sheet 1.
P. H. CONNER & L. CLARK.
CORN HUSKER.
No. 574,136. Patented Dec. 29, 1896.
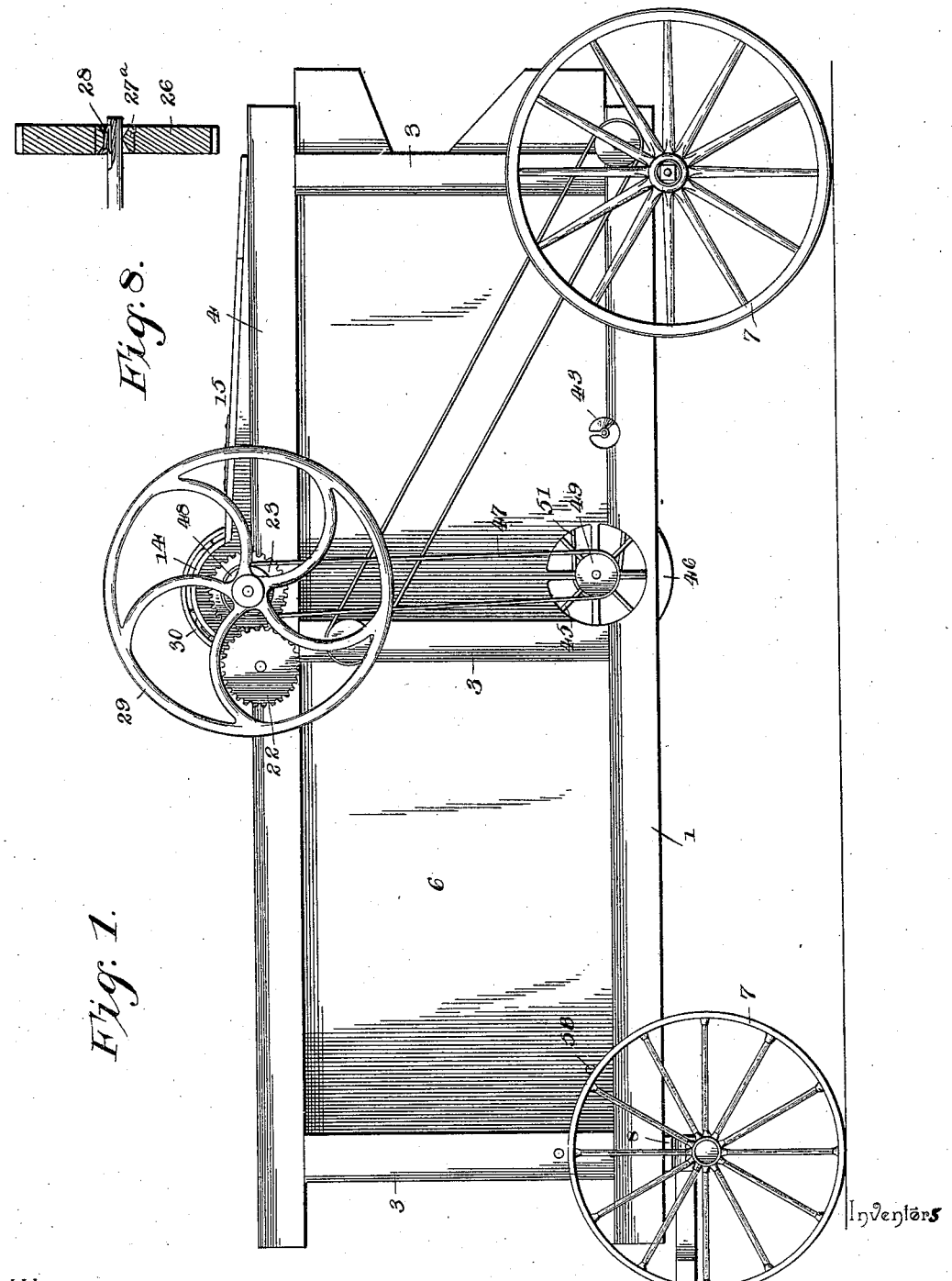
Witnesses
Chas. A. Ford.
R. M. Smith.
By their Attorneys,
Inventors
Patrick H. Conner,
and Leroy Clark,
C. A. Snow & Co.

(No Model.) 5 Sheets—Sheet 2.
P. H. CONNER & L. CLARK.
CORN HUSKER.
No. 574,136. Patented Dec. 29, 1896.
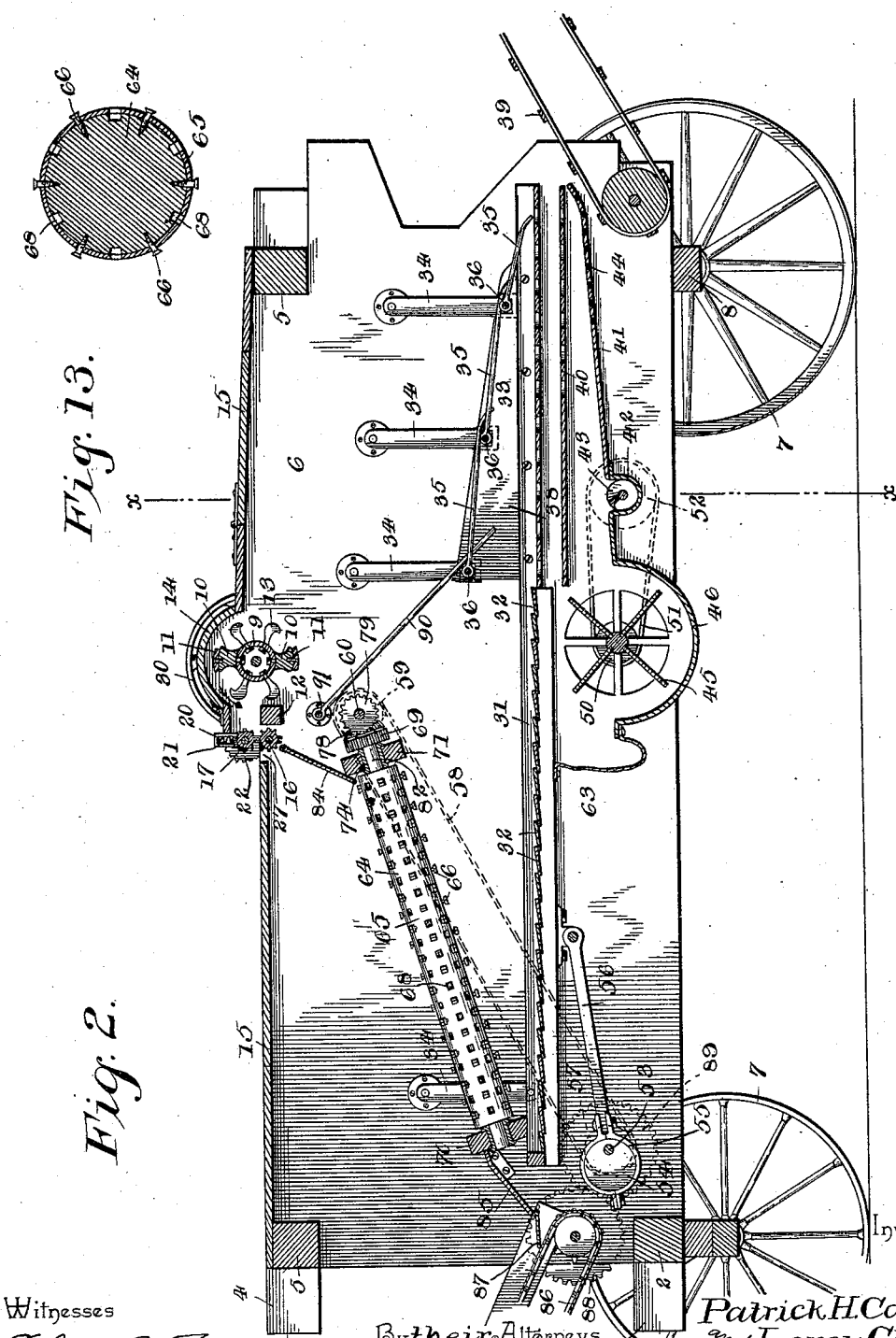
Witnesses
Chas. A. Ford.
R. M. Smith.
Inventors
Patrick H. Conner,
and Leroy Clark,
By their Attorneys,
C. A. Snow & Co.

(No Model.) 5 Sheets—Sheet 3.

P. H. CONNER & L. CLARK.
CORN HUSKER.

No. 574,136. Patented Dec. 29, 1896.

Witnesses
Chas. A. Ford.
R. M. Smith.

Inventors
Patrick H. Conner,
and Leroy Clark,
By their Attorneys,
C. A. Snow & Co.

(No Model.) 5 Sheets—Sheet 4.
P. H. CONNER & L. CLARK.
CORN HUSKER.
No. 574,136. Patented Dec. 29, 1896.
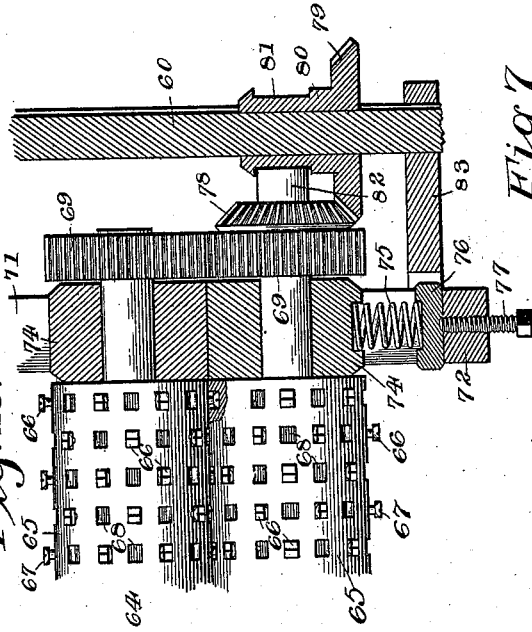
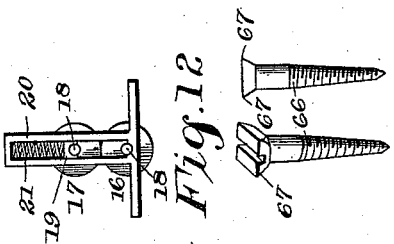
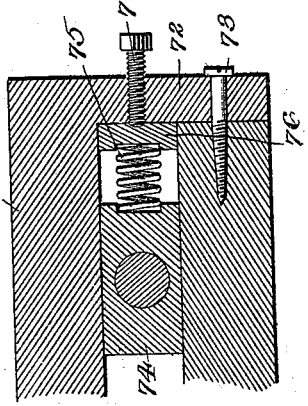
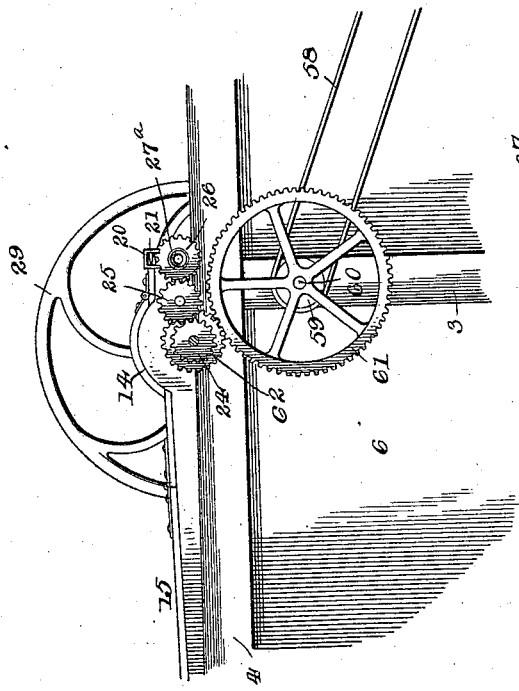
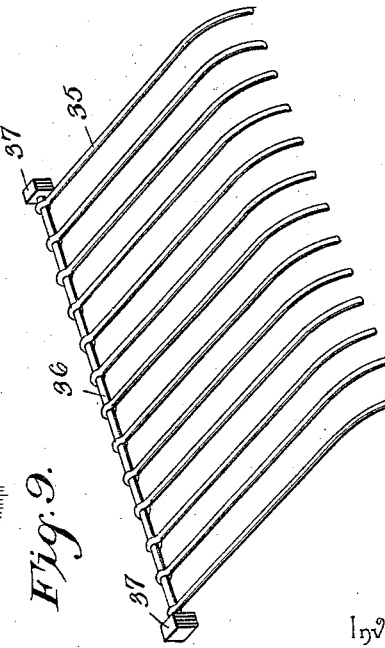
Witnesses
Chas. A. Ford.
R. M. Smith.
Inventors
Patrick H. Conner,
and Leroy Clark,
By their Attorneys.
C. A. Snow & Co.

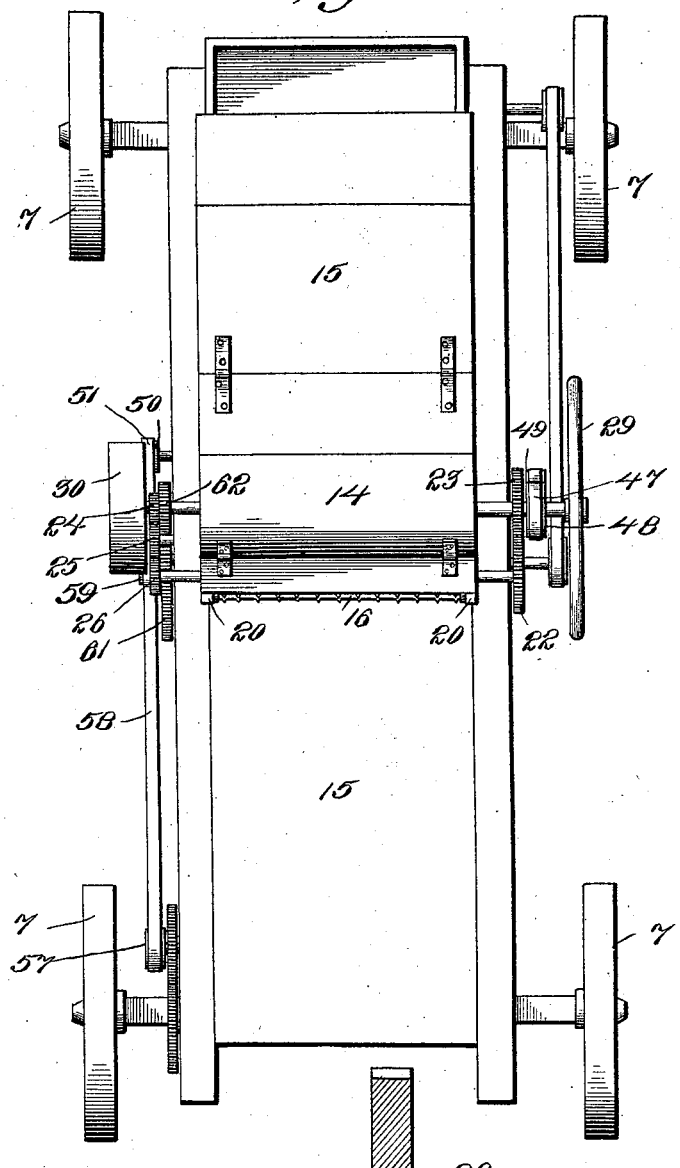

UNITED STATES PATENT OFFICE.

PATRICK H. CONNER AND LEROY CLARK, OF MONTICELLO, IOWA.

CORN-HUSKER.

SPECIFICATION forming part of Letters Patent No. 574,136, dated December 29, 1896.

Application filed June 8, 1895. Serial No. 552,152. (No model.)

*To all whom it may concern:*

Be it known that we, PATRICK H. CONNER and LEROY CLARK, citizens of the United States, residing at Monticello, in the county of Jones and State of Iowa, have invented a new and useful Corn-Husker, of which the following is a specification.

This invention relates to an improvement in corn-husking machines, and has for its object to simplify and improve machines of the character referred to with a view to rendering the same more reliable and efficient in operation and effecting a more thorough separation of the husks and fodder from the shelled corn, &c.

One of the objects of this invention is to provide an improved form of gearing for driving the feed-rollers by which the material is fed into the machine.

Another object is to provide an improved form of cutting and shredding cylinder for chopping up the fodder.

A further object of the invention is to provide a novel form of husking-roller and to combine therewith a removable and adjustable husking-peg.

A further object of the invention is to mount the husking-rollers within the machine in such manner that one or more of said rollers may be readily removed when found desirable or necessary and to gear the husking-rollers with a common driving-shaft in such manner that said rollers may yield without throwing them out of gear with said driving-shaft.

Another object of the invention is to provide a more efficient construction and arrangement of tedders and driving mechanism therefor and to combine therewith an inclined grate, whereby the fodder is subjected to a more thorough shaking up, and, as a result, a more thorough separation of the shelled corn therefrom effected.

Other objects and advantages of the invention will appear in the course of the subjoined description.

In order to accomplish the objects above enumerated, the invention consists in certain novel features and details of construction and arrangement of parts whereby certain advantages in point of simplicity and efficiency are attained, as hereinafter fully set forth, illustrated in the drawings, and finally embodied in the claims.

Figure 6:
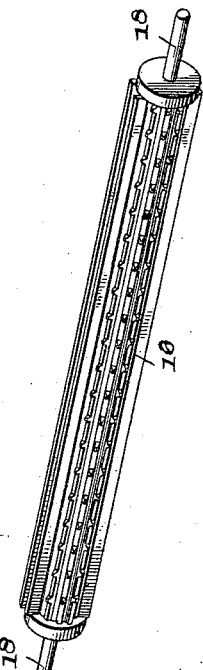
Figure 3:
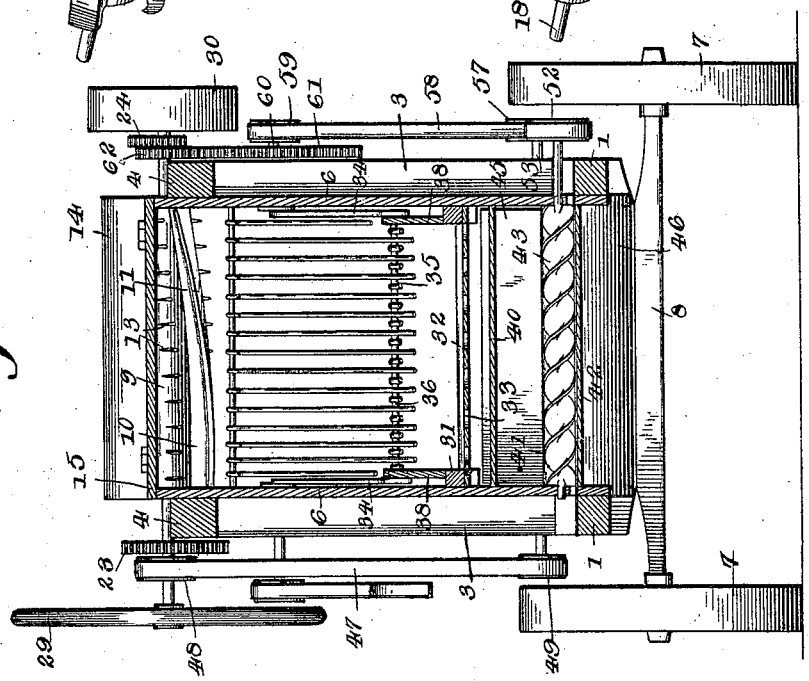

In the accompanying drawings, Figure 1 is a side elevation of the improved corn-husking machine constructed in accordance with this invention, illustrating the manner of driving the feed-roll, husking-rollers, eccentric driving-shaft, and blast-fan. Fig. 2 is a vertical longitudinal section taken through the machine, showing the interior construction and relative arrangement of the various parts of the machine. Fig. 3 is a vertical transverse section taken on the line $x\,x$ of Fig. 2. Fig. 4 is a side elevation of a portion of the machine, showing the arrangement of feed-roller gearing, said view being taken from the opposite side to Fig. 1. Fig. 5 is an enlarged detail perspective view of the slitting or shredding and cutting cylinder. Fig. 6 is a similar view of one of the feed-rollers. Fig. 7 is a detail end elevation of the upper and lower feed-rollers, showing one of the guiding-brackets in which said rollers are mounted. Fig. 8 is a sectional view taken through the spur-gear on the end of the upper feed-roller. Fig. 9 is an enlarged detail perspective view of one set of tedders, showing the form and construction of their actuating-shaft. Fig. 10 is a horizontal section taken through the bearing-plate in which the upper ends of the husking-rollers are journaled, said section also extending through the driving-shaft and bevel-pinion for imparting motion to the husking-rollers, the latter being shown in plan. Fig. 11 is a vertical longitudinal section through one end of the bearing-plate in which the husking-rollers are mounted, illustrating the manner in which the two members of said plate may be separated for enabling the husking-rollers to be removed. Fig. 12 shows the form of the improved husking-peg in perspective and elevation. Fig. 13 is a transverse section taken through one of the husking-rollers, showing the wooden core, the surrounding metal casing, and the form and arrangement of the husking-pegs and their sockets. Fig. 14 is a plan view of the corn-husking machine, showing the gearing by which motion is communicated from the main driving-cylinder shaft to the shafts of the feed-rolls. Fig. 15 is an enlarged sectional view through the spur-gear on the end of the upper feed-roller, similar to Fig. 8, but on a larger scale.

Similar numerals of reference designate corresponding parts in the several figures of the drawings.

Referring to the accompanying drawings, the frame of the machine comprises the longitudinally-extending base-timbers 1, spaced the required distance apart and joined at their ends by transverse beams 2. Uprights or standards 3 extend upwardly from this rectangular frame and are connected at their upper ends by longitudinal timbers 4, which are united at their ends to transverse end timbers 5, thus forming a rectangular frame or housing which is boarded in upon each side, as indicated at 6.

7 designates the ground-wheels, and 8 the axles upon which such frame or housing is mounted and supported, adapting the machine to be drawn by a team to the point where it is desired to use the same.

9 designates the cutting and shredding cylinder, which is mounted in bearings supported upon the longitudinal timbers 4 at the top of the machine, said cylinder being arranged about centrally of the length of the machine and extending transversely across the same. This cylinder is provided upon its periphery and at points diametrically opposite with radially-projecting and spirally-disposed ribs or extensions 10, to the outer faces of which are secured two spiral knives or cutters 11. By means of such spiral arrangement of the knives or cutters 11 and their operation against a stationary knife-bar 12, extending transversely across the machine, as shown in Fig. 2, a shearing cut is produced which results in an easier operation of the cylinder and a more efficient cutting action, besides rendering the knives or cutters to a certain extent self-sharpening. Between the spiral knives or cutters is arranged a series of slitting-knives, of which there may be one, two, or more rows, said rows extending in about parallel relation to the knives or cutters and being disposed spirally, as illustrated in Fig. 5. These knives (indicated at 13) are formed with rounded cutting edges and may be either sharp or dull, according to the character of work to be performed by them. This cylinder is covered by means of a curved hood or plate 14, and the remainder of the top of the machine is boarded over in any convenient manner, as indicated at 15.

Arranged in advance of the cutting and shredding cylinder is a pair of feed-rollers, disposed one above the other, the lower one being indicated at 16 and the upper one at 17. These feed-rollers are provided with longitudinally-extending ribs, certain ones of which are toothed and the remaining ones formed with straight edges, as shown in Fig. 6. The journals 18 of these feed-rollers are mounted in bearing-blocks 19, slidably mounted in vertically-slotted brackets 20, arranged at either side of the machine. The lower feed-roller 16 remains stationary, while the upper feed-roller 17 is adapted to yield upwardly at either or both ends by means of spiral springs 21, interposed between the bearing-blocks of the upper roller and the upper end of each slotted bracket, as shown in Fig. 7, said springs normally holding the feed-rollers in contact. Upon one end the lower feed-roller shaft carries a spur-gear 22, which meshes with and is driven by a similar gear 23, keyed to the corresponding end of the cylinder-shaft, as shown in Fig. 1. The cylinder-shaft being the main driving-shaft of the machine, motion is thus imparted directly to the lower feed-roller 16. This cylinder-shaft has keyed to its opposite end a spur-pinion 24, by means of which motion is imparted through an interposed idler spur-pinion 25, to a similar pinion 26 on the corresponding end of the upper feed-roller 17. By this arrangement it will be seen that the upper and lower feed-rollers are driven in opposite directions, adapting them to feed the material rearwardly to the action of the shredding and cutting cylinder, by means of which the stalks are first slitted by the shredding-knives 13 and then cut or chopped off in short lengths by the spiral knives or cutters 11. At the same time the ears of corn are snapped from the stalks by the feed-rollers and dropped through an open space 27 in the top of the machine, just in advance of the feed-rollers, whence they fall upon and gravitate downwardly upon a series of inclined husking-rollers, which will hereinafter be described. The spur-pinion 26 is provided with a central bushing $27^a$, the bore of which tapers or flares outwardly in either direction from a central point, as illustrated in Fig. 8, so that the pinion 26 bears only at a single point upon the shaft of the upper feed-roller, being keyed to said shaft by means of a spring-key 28, so as to revolve therewith. By means of this construction the pinion 26 is adapted to have a slight rocking movement upon the upper feed-roller shaft, which will allow the upper feed-roller to lift at either end, and yet preserve the proper alinement and mesh between said pinion and the intermediate idler-pinion 25. The cylinder-shaft is provided upon one end with a fly-wheel 29, and upon its opposite end with a band-pulley 30, by means of which the cylinder and other parts of the machine are driven.

31 designates the main shaker or sieve, which at one end comprises a series of transverse inclined slats 32, and at its opposite or rear end is provided with a perforate screen 33. This shaker or sieve is supported in horizontal position by means of pendent links 34, pivoted at their upper ends within the machine-frame. At the rear of the machine and over the screen 33 are arranged three series of tedders or kickers 35, as shown in Fig. 2. By reference to Fig. 9 it will be seen that these tedders, which are formed from stout wire, are arranged in parallel relation to each other, and each series is connected to a common shaft 36, provided at opposite ends with square blocks or end pieces 37, which fit snugly into openings of a corresponding shape in the lower swinging ends of pendent links 34. The shafts 36 are also mounted in bearings in a pair of upwardly-extending side boards 38, secured to and carried by the shaker or sieve 31, and as the latter is reciprocated by means hereinafter described a corresponding motion is imparted to the tedder-shafts, and by reason of the tedders being rigidly connected to their shafts a tossing or kicking motion will be imparted to said tedders, thereby effecting a thorough agitation of the fodder thereon and separating therefrom any loose grains of corn.

The free swinging ends of the tedders are given a downward curve or bend, so as to overlap the shaft of the next series of tedders and to facilitate the passage of the fodder over the several series of tedders and the discharge of the same upon a slatted conveyer-belt 39 at the rear of the machine for carrying said fodder to the desired point of discharge. The forward series of tedders is arranged in a higher plane than the second series, and the following series of tedders are arranged each in a lower plane than the preceding one, whereby the fodder as it is agitated gravitates toward the rear of the machine and its discharge therefrom is facilitated. The shelled or loose corn drops through between the tedders onto the perforate screen 33 and through the perforations therein upon a lower screen or riddle 40, and on through this latter screen or riddle upon an inclined bed or apron 41, whence said corn gravitates toward the front of the machine and falls into a conveyer-trough 42, in which is arranged a rotary spiral conveyer or auger 43, by which the corn is conveyed toward the side of the machine and is discharged therefrom into a suitable bag or receptacle. The inclined apron 41 at or near its rear end is provided with fine perforations 44, which provide for the escape of dirt, dust, &c. As the corn passes downwardly through the screens 33 and 40 and upon the inclined apron 41 it is subjected to a blast of air, generated by a rotary fan 45, operating within a suitable casing 46, located about centrally of the machine and beneath the shaker and just in advance of the front end of the riddle or screen 40. The chaff and dirt is thus separated from the corn and ejected from the machine and the fan is driven by means of a belt 47, running over a pulley 48 on the cylinder-shaft and a pulley 49 on the fan-shaft. The opposite end of the fan-shaft is provided with another pulley 50, from which a belt or band 51 extends to and passes around a pulley 52 on the shaft of the spiral conveyer or auger 43, to which motion is thus imparted.

The shaker or sieve 31 is driven by means of a transverse shaft 53, arranged, preferably, near the front end of the machine, and provided with a pair of eccentrics 54, having metallic straps 55, passing around the same and connecting with a link or pitman 56, pivotally secured at its rear end to the shaker or screen, and preferably to the lower face thereof, as shown. This eccentric-shaft is provided at one end with a pulley 57, from which a driving-belt 58 extends around a pulley 59 on a centrally-arranged shaft 60, which imparts motion to the husking-rollers, said shaft 60 having motion imparted thereto through a large spur-gear 61, which meshes with and is driven by a spur-gear or pinion 62 on the main cylinder-shaft.

63 indicates a flexible guard, of canvas or other suitable material, which is secured to the lower side of the shaker or screen 31 and to the forward edge of the casing in which the blast-fan revolves, said guard extending transversely across the machine and serving to prevent the egress of dust and dirt at this point, while permitting the free reciprocation of said shaker or sieve.

The husking-rollers (indicated at 64) are made from wood and covered with a cylindrical metal casing 65, which is perforated at numerous points to receive husking-pegs 66. These husking-pegs resemble an ordinary wood-screw, having a screw-threaded tapering shank and a slitted head, adapting them to be applied to the husking-rollers with the aid of a screw-driver. The side edges of the head of the husking-peg are beveled or chamfered off to form an acute edge, as shown at 67 in Fig. 12, said edge being adapted to engage the husks and tear or strip the same from the ears. With the aid of a screw-driver or wrench the husking-pegs may be screwed into or out of the husking-rollers, thus adapting the distance which said husking-pegs shall project from the peripheries of the husking-rollers to be adjusted at will. Each of the husking-rollers is provided with a series of such pegs or screws, and is also provided with a series of sockets 68, disposed in such manner as to receive the heads of the husking pegs or screws upon the adjacent roller. The husking-rollers are thus caused to intermesh, thereby providing effective means for grasping and tearing or stripping the husks from the ears of corn as they gravitate down the husking-rollers. The husking-rollers are arranged in pairs and geared together, as illustrated in Fig. 10, by means of spur-gears 69, keyed to the adjacent ends of the shafts of the husking-rollers. The husking-rollers incline downwardly toward the front of the machine and have the lower ends of their shafts journaled in bearings in a transversely-extending bearing-plate 70, the upper ends of the husking-roller shafts being journaled to bearings in a plate 71, divided horizontally and longitudinally or formed in two sections, as illustrated in Fig. 11, one of the sections being provided at either end with arms or extensions 72, which overlap the ends of the other section and are secured thereto by means of screws 73 or other suitable fastenings. The shaft of one of the husking-rollers of each pair is mounted in a bearing-block 74, which is arranged to slide longitudinally between the sections of the bearing-plate 71.

The bearing block or box 74 is normally pressed toward the bearing of the adjacent roller by means of a spiral spring 75, the tension of which may be regulated by means of a movable spring-seat 76 and an adjusting-screw 77, operating thereon and working through a threaded perforation in the arm or extension 72. This arrangement will permit the husking-rollers to yield apart, when necessary, for permitting the husks and detached pieces of stalk, &c., to pass through between the same. The husking-rollers are driven from the centrally-located transverse shaft 60 by means of a bevel or miter gear 78, keyed to the shaft of each movable husking-roller, said gear meshing with a corresponding bevel or miter gear 79, feathered to the shaft 60. The gear 79 is provided with a hub 80, in which is formed an annular groove 81 of a size adapted to receive the upper extremity of the shaft 82 of the yielding husking-roller. By reason of this construction it will be apparent that as the yielding husking-roller is moved away from the stationary roller the shaft 82 will slide the bevel or miter gear 79 upon the driving-shaft 60, to which it is feathered, thus always preserving the mesh and proper driving connection between the gears 78 and 79. The bearing-plate 71 is supported upon the transverse driving-shaft 60 by means of rearwardly-projecting ears 83, formed integrally with or secured to said bearing-plate and perforated to receive the shaft 60. This construction not only affords a support for the bearing-plate 71, but enables the husking-rollers to be elevated at their lower advance ends by lifting the bearing-plate 70, in which the lower ends are journaled, in a manner that will be readily understood. By the construction just described it will also be seen that by reason of the separable feature of the upper bearing-plate 71 one or more of the husking-rollers may be removed when desired for repairing the same or renewing the husking-pegs thereof.

In order to direct the ears of corn properly to the husking-rollers, we provide a guard or deflector 84, which extends transversely within the machine-frame and is pivoted therein at its upper ends beneath the lower feed-roller, the lower end of said guard or deflector resting, preferably, upon the upper bearing-plate 71 of the husking-rollers. The ears, as they are snapped from the stalks by the feed-rollers, will pass downward through the opening 27 and be deflected by the guard 84 forwardly upon the husking-rollers 64. After the husks are torn from the ears, as hereinbefore described, said ears gravitate toward the lower end of the husking-rollers and are directed by an inclined table or apron 85 onto an endless slatted apron or carrier 86, by which they are carried to the desired point of discharge.

The tendency of the ears to pass backward and from off the end of the carrier 86 is effectively prevented by means of a pivoted flap or guard 87, pivotally mounted within the frame of said carrier and resting at its lower free end upon the endless carrier-belt, as shown. This carrier is driven by means of a spur-gear 88, keyed to the shaft thereof at one end and meshing with a similar spur-gear 89, fast on the end of the eccentric-shaft 53, which is driven in the manner hereinbefore described.

90 designates a grate or deflector composed of a series of parallel wires or rods united to a common shaft 91, extending transversely across within the machine frame or housing and arranged approximately beneath the stationary knife-bar 12. The lower ends of the wires or rods of which the grate 90 is composed overlap and rest upon the shaft 36 of the first series of tedders, and as the tedder-shafts are reciprocated, as hereinabove described, a corresponding motion is imparted to the grate 90, by means of which the fodder passing downwardly upon said grate is conveyed immediately to the tedders 35, while the loose or shelled corn present in the fodder will be allowed to fall between the rods or wires of the grate 90 and upon the shaker or sieve 31, by which the corn is conveyed toward the rear of the machine, where it falls through the screen 33 and riddle 40 upon the inclined apron 41, and finally passes into the conveyer-trough, from whence it is discharged from the machine.

It will be apparent that by removing the feed-rollers described and substituting in lieu thereof feed-rollers of a larger pattern the machine may be used for cutting green and dry feed the same as any ordinary feed-cutter, in which event the husking-rollers may be thrown out of operation. It will also be apparent that changes in the form, proportion, and minor details of construction may be resorted to without departing from the spirit or sacrificing any of the advantages of this invention.

Having thus described the invention, what is claimed as new, and desired to be secured by Letters Patent, is—

1. In a corn-husking machine, the combination with the shredding and cutting cylinder having a spur-gear fast upon one end of its shaft and a pinion fast on the other end, of a pair of feed-rollers, one of which has at one end a spur-gear meshing with the spur-gear on the cylinder-shaft, and a spur-pinion secured to the opposite end of the shaft of the other feed-roller, and meshing with the spur-pinion on the cylinder-shaft through the medium of an interposed idler-pinion, all arranged for joint operation, substantially as and for the purpose described.

2. In a corn-husking machine, the combination with the cutting and shredding cylinder, and a spur-pinion keyed to the shaft thereof at one end, of a pair of feed-rollers, means for adapting one of said feed-rollers to yield with relation to the other feed-roller, and a spur-pinion mounted upon the shaft of the yielding feed-roller, said pinion having its central bore flared in such manner as to form an annular crest or ridge so that the pinion bears only at a single point upon the shaft, said point being in proximal relation to the diametrical center of said wheel, and a spring-key for connecting said pinion with its shaft whereby the alinement of said pinion with the pinion on the cylinder-shaft is preserved and the yielding feed-roller is adapted to yield relatively to the fixed feed-roller, substantially as and for the purpose described.

3. In a corn-husking machine, the combination with the cutting and shredding cylinder arranged at the top of the machine and located about centrally longitudinally thereof, of several sets or series of overlapping tedders or kickers arranged near the rear of the machine and supported upon swinging links, a vibratory shaker and screen underlying said tedders and connected therewith for imparting motion thereto, and a hinged grate comprising a series of parallel rods or fingers, said grate being pivoted in advance of the vertical plane of the cylinder-shaft and having the lower ends of its rods or fingers resting upon and overlapping the shaft of the first set or series of tedders, whereby said grate is adapted to be actuated by and to direct the fodder to the tedders or kickers, substantially as specified.

4. In a corn-husking machine, the combination with the machine-frame, and the stationary part of the fan-casing, of an oscillating shaker mounted therein and forming a movable part of the fan-casing, a blast-fan and a grain-conveyer working in a plane below said shaker, and a flexible guard interposed between and connecting the stationary and movable portions of said casing so as to close the intervening space between the same at one side of the fan, substantially as described.

In testimony that we claim the foregoing as our own we have hereto affixed our signatures in the presence of two witnesses.

PATRICK H. CONNER.
LEROY CLARK.

Witnesses:
W. F. ROHN,
A. MATTHIESSEN.